United States Patent
Brodt et al.

(10) Patent No.: US 10,565,176 B2
(45) Date of Patent: Feb. 18, 2020

(54) PROCESSING LARGE DATA TABLES

(71) Applicant: International Business Machines Corporation, Armonk, NY (US)

(72) Inventors: Andreas Brodt, Gerlingen (DE); James L. Finnie, Boeblingen (DE); Oliver Schiller, Dettingen/Teck (DE); Marc Schwind, Holzgerlingen (DE); Knut Stolze, Hummelshain (DE); Mathias Trumpp, Ulm (DE)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 15/223,838

(22) Filed: Jul. 29, 2016

(65) Prior Publication Data
US 2017/0068694 A1    Mar. 9, 2017

(30) Foreign Application Priority Data

Sep. 9, 2015   (GB) .................................. 1515950.2

(51) Int. Cl.
*G06F 16/22*    (2019.01)
(52) U.S. Cl.
CPC ...... *G06F 16/2264* (2019.01); *G06F 16/2282* (2019.01)
(58) Field of Classification Search
CPC .......... G06F 17/30333; G06F 17/3028; G06F 17/30477; G06F 17/3087; G06F 3/0608; G06F 3/0631; G06F 16/2264; G06F 16/2282; G06F 16/9537; G06F 16/22; G06F 16/2228; G06F 16/2455; G06F 16/283; Y10S 707/921

USPC .......................................... 707/743; 711/165
See application file for complete search history.

(56) References Cited

U.S. PATENT DOCUMENTS

| | | | |
|---|---|---|---|
| 6,353,832 B1* | 3/2002 | Acharya | G06F 16/24545 |
| 6,505,205 B1* | 1/2003 | Kothuri | G06F 16/2264 |
| 8,903,803 B1* | 12/2014 | Aly | G06F 16/2477 |
| | | | 707/713 |
| 8,996,544 B2 | 3/2015 | Ziauddin et al. | |
| 2002/0169784 A1* | 11/2002 | Cha | G06F 16/2264 |
| 2004/0177065 A1* | 9/2004 | Tropf | G06F 16/2264 |
| 2006/0184519 A1* | 8/2006 | Smartt | G06F 17/30241 |
| 2008/0133469 A1* | 6/2008 | Chen | G06F 17/30333 |

(Continued)

OTHER PUBLICATIONS

"Using Zone Maps", Oracle Database Data Warehousing Guide, 12c Release 1 (12.1), Jul. 2014. http://docs.oracle.com/database/121/DWHSG/zone_maps.htm.

(Continued)

*Primary Examiner* — Dennis Truong
(74) *Attorney, Agent, or Firm* — Richard Wilhelm; Edell, Shapiro & Finnan, LLC (57) ABSTRACT

The present disclosure relates to a method for processing a data table. The data table is divided into a plurality of data blocks, and a multidimensional data structure for representing the plurality of data blocks is generated. For each data block of at least part of the plurality of data blocks, a respective data element is added into the multidimensional data structure. The data element has multiple values indicative of a first attribute of the data block. The multidimensional data structure is stored for selectively processing a portion of the data blocks using the multidimensional data structure.

15 Claims, 5 Drawing Sheets

(56) References Cited

U.S. PATENT DOCUMENTS

| | | | | |
|---|---|---|---|---|
| 2009/0210413 | A1* | 8/2009 | Hayashi | G06K 9/6276 |
| 2010/0223441 | A1* | 9/2010 | Lillibridge | G06F 3/0608 |
| | | | | 711/165 |
| 2013/0339371 | A1* | 12/2013 | Hayashi | G06F 17/3087 |
| | | | | 707/743 |
| 2015/0088812 | A1 | 3/2015 | Ziauddin et al. | |
| 2015/0324373 | A1* | 11/2015 | Tyercha | G06F 16/2458 |
| | | | | 707/722 |
| 2015/0324399 | A1* | 11/2015 | Tyercha | G06F 16/221 |
| | | | | 707/792 |
| 2015/0347481 | A1* | 12/2015 | Chen | G06F 17/30244 |
| | | | | 707/743 |
| 2017/0068688 | A1* | 3/2017 | Brodt | G06F 16/29 |

OTHER PUBLICATIONS

Beckermann et al., "The R*-tree: An Efficient and Robust Access Method for Points and Rectangles." In Proceedings of the 1990 ACM SIGMOD International Conference on Management of Data, SIGMOD '90, pp. 322-331, New York, NY, USA, 1990. ACM.

Bentley, "Multidimensional Binary Search Trees Used for Associative Searching." Association for Computing Machinery, Inc.,18(9): pp. 509-517, Sep. 1975.

Guttman et al., "R-trees: A Dynamic Index Structure for Spatial Searching." In Proceedings of the 1984 ACM SIGMOD International Conference on Management of Data, SIGMOD '84, pp. 47-57, New York, NY, USA, 1984. ACM.

G. M. Morton. "A computer oriented geodetic data base; and a new technique in file sequencing." Technical report, IBM Ltd, Ottawa, Canada, 1966.

Nievergelt et al., "The Grid File: An Adaptable, Symmetric Multikey File Structure." ACM Transactions on Database Systems, vol. 9, No. 1, pp. 38-71, Mar. 1984.

"Optimizing Table Scans with Zone Maps", Oracle Blog by nbayliss-Oracle, Nov. 11, 2014, retrieved from internet Jul. 25, 2016: https://blogs.oracle.com/datawarehousing/entry/optimizing_table_scans_with_zone.

* cited by examiner

| query predicate | query rectangle | |
| --- | --- | --- |
| | lower left corner | upper right corner |
| $col = c$ | $(v_{min}, c)$ | $(c, v_{max})$ |
| $col \leq c$ | $(v_{min}, v_{min})$ | $(c, v_{max})$ |
| $col < c$ | $(v_{min}, v_{min})$ | $(c-\varepsilon, v_{max})$ |
| $col \geq c$ | $(v_{min}, c)$ | $(v_{max}, v_{max})$ |
| $col > c$ | $(v_{min}, c+\varepsilon)$ | $(v_{max}, v_{max})$ |

PROCESSING LARGE DATA TABLES

BACKGROUND

The present invention relates to the field of digital computer systems, and more specifically, to processing a data table.

Analytical database systems manage very large amounts of data and are optimized for queries that must read large fractions of data. The analytical database systems typically evaluate the query predicate on all data blocks by linearly iterating over the data blocks. However, the trend in analytical databases of increasing table sizes ("Big Data") results in large data tables, where processing such large data tables is expensive in terms of processing resources.

SUMMARY

Various embodiments provide a method for processing a data table, a computer program product and a computer system as described by the subject matter of the independent claims. Advantageous embodiments are described in the dependent claims. Embodiments of the present invention can be freely combined with each other if they are not mutually exclusive.

According to an embodiment of the present invention, a computer implemented method for processing a data table is provided. The method comprises: dividing the data table into a plurality of data blocks; generating a multidimensional data structure for representing the plurality of data blocks; for each data block of at least part of the plurality of data blocks, adding a respective data element into the multidimensional data structure, the data element having multiple values indicative of a first attribute of the data block; and storing the multidimensional data structure for selectively processing a portion of the data blocks using the multidimensional data structure.

According to an embodiment of the present invention, a computer program product is provided. The computer program product comprises a computer readable storage medium having program instructions embodied therewith, the program instructions executable by a processor to: divide the data table into a plurality of data blocks; generate a multidimensional data structure for representing the plurality of data blocks; for each data block of at least part of the plurality of data blocks, add a respective data element into the multidimensional data structure, the data element having multiple values indicative of a first attribute of the data block; and store the multidimensional data structure for selectively processing a portion of the data blocks using the multidimensional data structure.

According to an embodiment of the present invention, a computer system for processing a data table is configured to perform the above method steps.

According to an embodiment of the present invention, a computer implemented method for generating a multidimensional data structure is provided. The method comprises for each data block of a plurality of data blocks, adding a respective data element into the multidimensional data structure, the data element having multiple values indicative of a first attribute of the data block.

According to an embodiment of the present invention, a computer implemented method for processing attribute value information on data blocks of a data table is provided. The method comprises: providing attribute value information for at least a first attribute contained in data blocks of the data table, wherein the attribute value information includes a minimum attribute value of a data block and a maximum attribute value of a data block; creating a spatial index on the attribute value information of the first attribute, wherein the minimum attribute values and the maximum attribute values for the data blocks are treated as two-dimensional points; and storing the spatial index for selectively processing a portion of the data blocks using the spatial index.

BRIEF DESCRIPTION OF THE DRAWINGS

In the following, embodiments of the invention are explained in greater detail, by way of example only, making reference to the drawings in which.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To date, analytical database systems typically evaluate the query predicate on all data blocks by linearly iterating over them. The trend, however, in analytical databases is increasing table size (Big Data). This is expensive in terms of processing resources. Additionally, in case of range queries, sorting data blocks by minimum values is not enough as it disregards the maximum value. Further, two separate sorted lists for min and max would double maintenance effort and memory requirements.

At least part of the data blocks may be predefined (e.g., user defined). The method may comprise receiving from a user a selection of at least part of the data blocks. In another example, at least part of the data blocks may automatically be selected (e.g., randomly or based on a selection condition). The random selection may be advantageous for data analysis having test purposes. The selection condition may comprise selecting data blocks having a size higher than a predefined size. This may enable using only the majority of the data, as small sized data blocks may not be relevant or may not influence the processing results when used.

The term "multidimensional data structure" refers to a data structure for indexing multidimensional information. The multidimensional data structure may, for example, represent a map that is viewed as a two dimensional image, wherein points on the map are stored as data elements on the multidimensional data structure. The multidimensional data structure may comprise a spatial index. The multidimensional data structure supports various types of queries (e.g., a range query). The range query retrieves all tuples of a multidimensional space matched by a query rectangle.

The data blocks may be stored on a disk and/or a memory of a computer system. For example, the division of the data table may be performed using the multiple values of the first attribute. The multiple values of the first attribute may represent the whole column of a given data block associated with the first attribute (i.e., each entry of the column of the given data block has attribute values that match the multiple values of the first attribute that is assigned to the data element representing the given data block). For example, the multiple attribute values of the first attribute comprise date values (e.g., 2009 and August). In this example, all entries of the data block represented by the attribute values (2009, August) have date values that match that period (e.g., an entry of the given data block may have a date value of 2009.08.01, another entry of the given data block may have a date value of 2009.08.25 etc.).

The term "disk" as used herein may comprise a hard disk drive (HDD), a direct access storage device (DASD) or a logical unit number (lun) in a storage device. The term "disk" is intended to embrace not only magnetic storage devices, but also optical, solid state and other types of storage devices.

In one embodiment, the multidimensional data structure comprises a spatial index. The spatial index may be used to divide the indexed space (space defined by the multiple values of the first attribute and covering the data elements of the spatial index) into search rectangles (or index rectangles) each comprising a respective number of data elements. For example, a search rectangle may be defined by a lower left corner and an upper right corner. In this case, the multiple attribute values assigned to a given data element comprise the minimum and maximum values of the first attribute in the respective data block, the lower left corner may be defined by the lowest minimum and maximum values of the requested range and the upper right corner may be defined by the highest minimum and maximum values of the requested range. Using this data structure, only search rectangles that are covered by the query area may be searched. A search rectangle is either completely contained in, partially overlapping with, or disjoint with the query area. If a search rectangle is contained in the query area, then all its contained data elements are part of the query result. Since no individual evaluation may be required, a big improvement over the conventional evaluation methods may be reached. Data elements in search rectangles that the query area partly covers may be evaluated individually. Search rectangles that are disjoint with the query area may be ignored. The query area is defined by two or more cuts on respective attribute values of the multiple attribute values.

The above features may enable an optimal selection of data blocks of the data table to be accessed without having to fully scan data table content (e.g., on disk). This may preserve processing resources in the computer system (i.e., fewer computer processing resources are required). In addition, through using the multidimensional structure (e.g., spatial index), a search involving the entire two-dimensional space for covered points may be avoided by searching regions that match query areas only.

The multiple attribute values of a given data block are represented by a single entry in the multidimensional data structure. Thus, instead of performing multiple selections on respective multiple attribute values, the present method may enable a single selection on entries of the multidimensional data structure. This may further preserve processing resources, in particular for processing Big Data with millions of data bocks.

Another advantage may reside in the reduction of the processing time required by the present method compared to conventional methods.

According to one embodiment, the selective processing comprises: receiving a query having a selection condition on the first attribute; selecting data elements of the multidimensional data structure whose multiple attribute values match or satisfy or partially satisfy the received query; and executing the received query on the portion of data blocks that correspond to the selected data elements.

For example, multiple attribute values may comprise the minimum and maximum of the first attribute in a given data block. The query may, for example, concern a search interval. In this case, if the range of a given data block overlaps partially or fully (i.e., satisfies or partially satisfies the query) with the search interval, then the data element associated with that given data block is selected.

Instead of scanning the full data table, only part of the data table that is required for satisfying the query is scanned. The part of the table comprises the selected data blocks. This may further save processing resources.

According to one embodiment, the first attribute is a single value attribute, the multiple values comprise the maximum and the minimum values of the first attribute in the respective data block, and the multidimensional data structure comprises a spatial index. The multiple values may indicate or represent the maximum and the minimum values of the first attribute in the respective data block. The indicated maximum and minimum values may or may not be current minimum and maximum values of the first attribute in the respective data block (e.g., because the content of the data block has been updated in the meantime (after the time at which the multiple values have been determined)).

According to one embodiment, the maximum and the minimum values define a first range of values of the first attribute in a respective data block, and the method further comprises: receiving a query requiring a second range of values of the first attribute; selecting data elements of the spatial index whose first ranges (partially or fully) overlap with the second range; and executing the received query on the data blocks that correspond to the selected data elements. These embodiments may speed up range searches on the data table.

According to one embodiment, the first attribute is a multi-value attribute comprising a first and a second value, wherein the first and second values are treated as a two-dimensional point in the multidimensional data structure.

A multi-value attribute is an attribute whose value holds or indicates multiple information, such as a date value or a phone number, etc. For example, the multi-value attribute may have or encompass at least a first sub-attribute and a second sub-attribute (e.g., a date attribute written as Year.Month.Day is a multi-value attribute having "year", "month" and "day" as sub-attributes). For example, in the case of the date value, the first value may indicate the year, and the second value may relate to the month. This embodiment may have the advantages as described above. Further, this embodiment may further enlarge the data samples that would benefit from the selective data block access.

According to one embodiment, the method further comprises: receiving a query having a selection condition on the first value and/or second value; selecting data elements of the multidimensional data structure whose first and/or second value satisfies the selection condition on the first and/or second value respectively; and executing the received query on the data blocks that correspond to the selected data elements.

The received query may, for example, select the number of users that hold a mobile phone in the region of Hessen in Germany. In this case, the first value may, for example, represent a country and the second value may represent a city. The data table may be divided such that each data block of the data blocks represent a given country and a city (e.g., a data block may comprise phone numbers of users from Wiesbaden in Germany, etc.). In this case, the data elements that have the first value equal to "Germany" and the second value equal to a city name of Hessen may be selected.

According to one embodiment, the dividing of the data table is randomly performed or performed through a preselection criterion using values of the first attribute. Both division methods may be used for the range searches as well as the search based on the multi-value attributes. The random division may, however, particularly be advantageous for the range searches. The preselection based division may particularly be advantageous for the multi-value attribute selection.

The random division may be advantageous as it may provide data blocks that can be equally searched by different types of range queries. The preselection based division may be advantageous as it may provide a controlled optimized access to data blocks using predefined queries on the first attribute.

According to one embodiment, the preselection criterion comprises one of: each data block of the plurality of data blocks having a predefined range of values of the first attribute; and a predefined selection on a single value (or more than one value) of the multiple values of the first attribute, wherein the first attribute is a multi-value attribute.

According to one embodiment, the method further comprises: providing processing resources for processing a predefined maximum size of data, the data table having a size higher than the maximum size and each data block of the plurality of data blocks having a size smaller than the maximum size. The processing resources may comprise memory storage. The present embodiment may particularly be advantageous for Big Data tables that cannot be fully loaded into the memory.

According to one embodiment, each data block of the plurality of data blocks contains an equal or unequal number of rows of the data table. Having an equal number of rows may be advantageous as it may provide controlled and predictable processing requirements for the data blocks. Having an unequal number of rows may enable fast processing for given query searches.

According to one embodiment, the plurality of data blocks has no common rows of the data table. This may prevent duplicate processing of the same data by the present method, and may thus save processing resources that would otherwise be required for processing the duplicate entries.

According to one embodiment, the first attribute is a spatial and/or temporal coordinate.

According to one embodiment, the multiple values specify the spatial coordinate, wherein the multiple values are treated as a two, three, or four dimensional point in the multidimensional data structure.

According to one embodiment, the multiple values comprise one of:
north, east, south, west directions; and
latitude, longitude, and elevation.

According to one embodiment, the method further comprises: receiving a spatial query that specifies a query window defined by selection of two or more values of the first attribute; selecting data elements of the multidimensional data structure whose multiple values intersect the query window; and executing the received query on the data blocks that correspond to the selected data elements. This embodiment may have the advantage of speeding up the spatial queries on spatial data.

Figure 1:
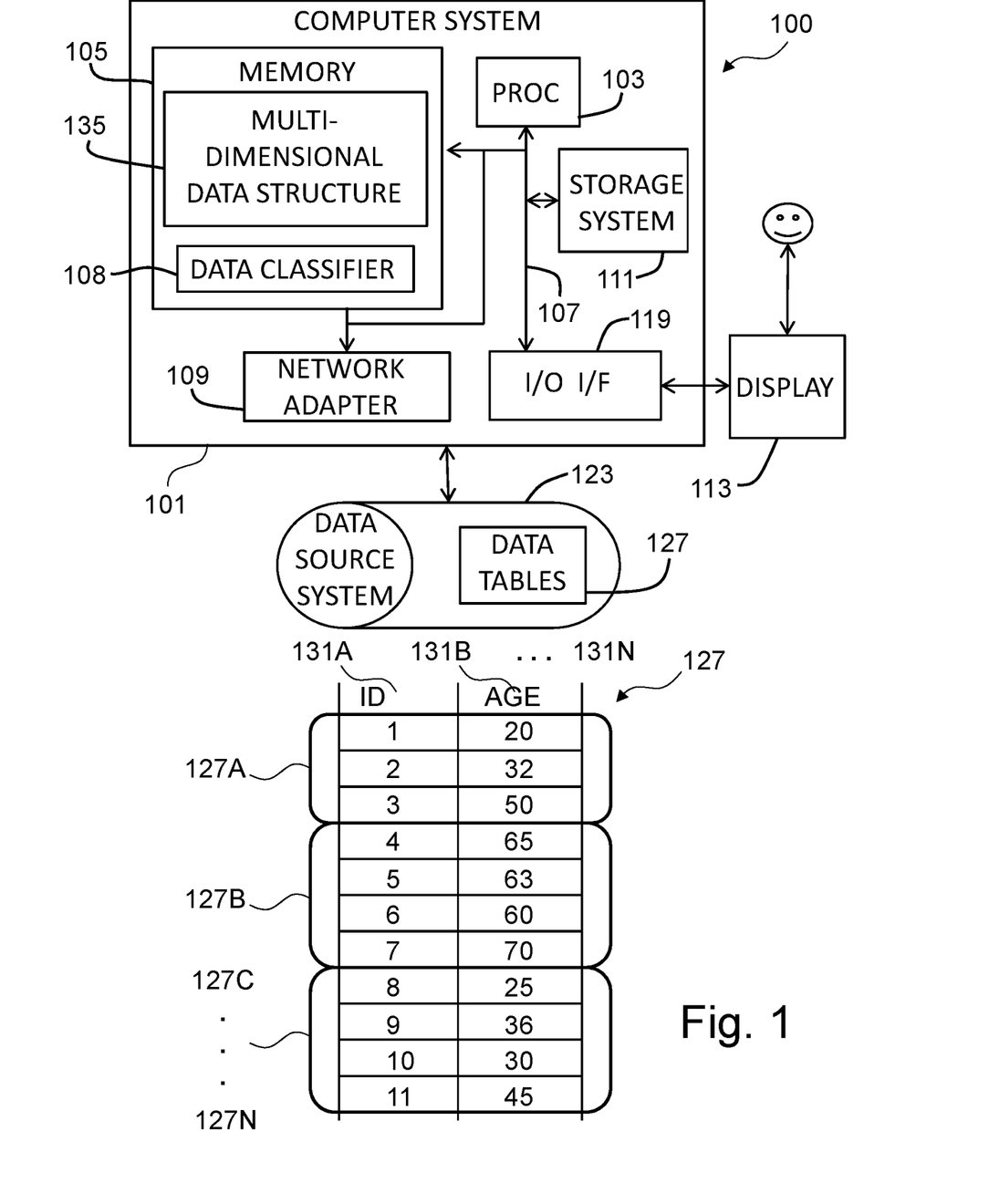
FIG. 1 depicts a functional block diagram illustrating a data processing system.

FIG. 1 depicts a functional block diagram illustrating a data processing system or computer system 100 according to an example embodiment of the present invention. The data processing system 100 may, for example, comprise an IBM i system.

The data processing system 100 comprises a computer system 101. The components of computer system 101 may include, but are not limited to, one or more processors or processing units 103, a storage system 111, a memory unit 105, and a bus 107 that couples various system components including memory unit 105 to processor 103. Storage system 111 may include for example a hard disk drive (HDD). Memory unit 105 may include computer system readable media in the form of volatile memory, such as random access memory (RAM) and/or cache memory.

Computer system 101 typically includes a variety of computer system readable media. Such media may be any available media that is accessible by computer system 101, and it includes both volatile and non-volatile media, removable and non-removable media.

Computer system 101 may also communicate with one or more external devices such as a keyboard, a pointing device, a display 113, etc.; one or more devices that enable a user to interact with data processing system 100; and/or any devices (e.g., network card, modem, etc.) that enable data processing system 100 to communicate with one or more other computing devices. Such communication can occur via I/O interface(s) 119. Still yet, data processing system 100 can communicate with one or more networks such as a local area network (LAN), a general wide area network (WAN), and/or a public network (e.g., the Internet) via network adapter 109. As depicted, network adapter 109 communicates with the other components of data processing system 100 via bus 107.

Memory unit 105 is configured to store applications that are executable on the processor 103. For example, the memory system 105 may comprise an operating system as well as application programs. The application programs comprise a data classifier application 108 (e.g., a database application). The data classifier application 108 may have access to one or more data tables 127. For example, the data classifier application 108 may receive (automatically or upon request) as inputs the data table 127, or may download the data table 127 from data source system 123.

The data processing system 100 may further comprise data source system 123. The data source system 123 may for example comprise a Hadoop platform. The data source system 123 may provide and store data table 127. The data source system 123 is connected to the computer system 101 via one or more networks for example, the Internet, a local area network, a wide area network and/or a wireless network.

In addition or alternatively, the data table 127 may be stored on the storage system 111 and/or memory unit 105.

Data source system 123 may support, for example, different storage models or techniques, such as relational, columnar, XML, graph, etc., that are representative for persistent repositories used to store data.

The data table 127 may comprise one or more columns 131A-N, wherein each column is represented by a respective attribute (e.g. "ID" and "Age"). The rows of the data table 127 may comprise values of the attributes. The data table 127 may comprise multiple data blocks 127A-N. For example, data blocks 127A-N may contain an equal or unequal number of rows of the data table 127. The data blocks 127A-N may have no common rows of the data table 127. The data blocks 127A-N may be separated from each other based on values of a first attribute of the attributes of the data table 127.

Each data block of the data blocks 127A-N may be identified or defined by a pair (or triplet etc.) of values (v1, v2) that are indicative of the first attribute.

For example, in case the first attribute comprises a single attribute value, the pair of values (v1, v2) may be equal to (min, max), where min (max) is the minimum (maximum) value of the first attribute in a data block. Each data block of the data blocks 127A-N may cover a respective range of values of the first attribute. For example, data block 127A may comprise data for users having an age 131B between 20 and 50 years, while data block 127B may comprise data for users having an age between 60 and 70 years etc. Thus, data block 127A may be defined by the pair (20, 50) while data block 127B may be defined by the pair (60, 70).

In another example, the first attribute may comprise a multi-value attribute such as International Mobile Subscriber Identity (IMSI) for user equipment. The IMSI may hold multiple information. For example, the IMSI may indicate the country, the city and the operator that provide a given user equipment. Using these multiple information obtained from the IMSI attribute, the data blocks may be separated from each other. For example, a data block 127A may comprise entries for user equipment of a given Phone Operator (e.g., O2) and for a given country (e.g., Germany), while data block 127B may comprise entries for user equipment of O2 and for France. In this case, a user willing to count the number of O2 users in Germany does not have to scan the whole data table 127, rather the user can scan data block 127A only. Thus, data block 127A may be defined by the pair ("Germany", "O2"), while data block 127B may be defined by the pair ("France", "O2").

The operation of the data processing system 100 will be described in details with reference to FIGS. 2-5.

Figure 2:
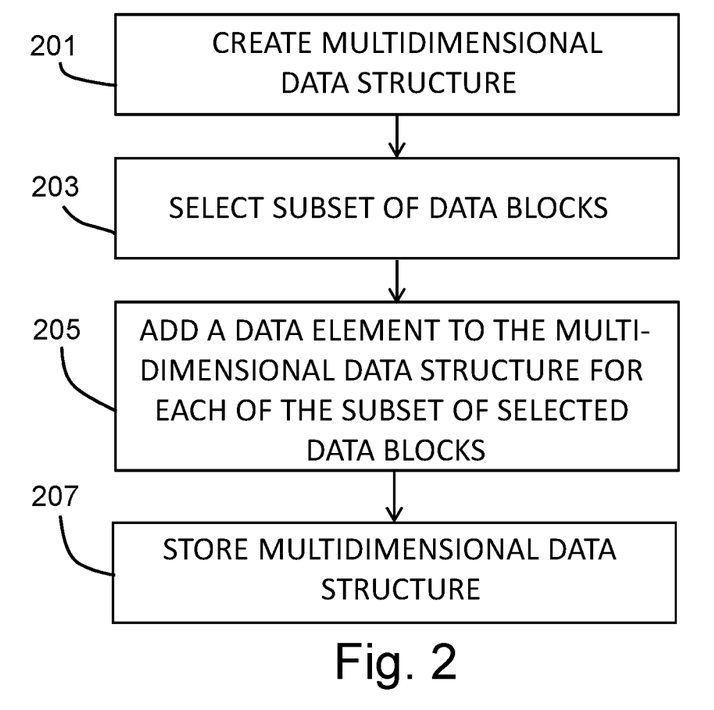
FIG. 2 is a flowchart of a method for processing a data table.

FIG. 2 is a flowchart of a method for processing a data table (e.g., data table 127). In step 201, the data classifier application 108 may generate or create a multidimensional data structure 135 for representing the plurality of the data blocks 127A-N. The multidimensional data structure may, for example, comprise a spatial index.

In step 203, the data classifier application may optionally select a subset of the data blocks (e.g. data blocks 127A-D) from the data blocks 127A-N. The subset of the data blocks may be randomly chosen or selected. This may be useful for test analysis for which a whole sample may not be needed. In another example, the subset of the data blocks 127A-N may be user defined (e.g., the data classifier application 108 may receive a selection of the portion of the data blocks from the user). In another example, the subset of the data blocks may be selected based on an analysis condition that is assigned to a given user. For example, if a given user is only interested in data from users located in Europe, the subset of the data blocks 127A-N may comprise only data related to Europe as entries for other continents may not be used by the given user.

In step 205, for each data block 127A of at least part (i.e., the subset of data blocks) of the plurality of data blocks 127A-N, the data classifier application 108 may add a respective data element into the multidimensional data structure 135. The data element has multiple values indicative of a predefined first attribute of the data block 127A. For example, for data block 127A that comprises entries for user equipment from Germany and having O2 as an operator, the data element that represents the data block 127A has the pair of values ("Germany", "O2"). The first attribute may be randomly chosen from attributes (of columns 131) or may be user defined.

In step 207, the multidimensional data structure 135 may, for example, be stored by the data classifier application 108 in the memory unit 105 and/or the storage system 111. The stored multidimensional data structure 135 may thus enable selective access to data blocks 127A-N (e.g., multidimensional data structure 135 may be used to select data blocks of data blocks 127A-N without having to scan data table 127 on disk). The selected data blocks may subsequently be scanned on disk to perform analysis or to be stored or backed-up, etc.

Figure 3:
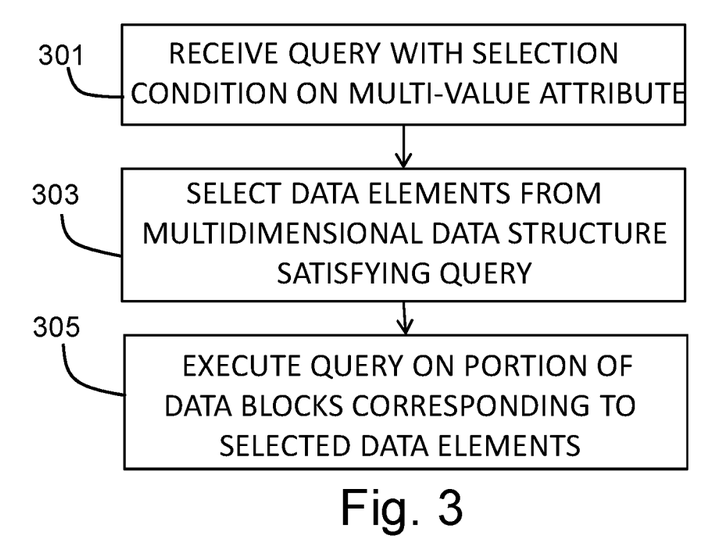
FIG. 3 is a flowchart of an example method for processing data blocks.

FIG. 3 is a flowchart of a method for processing data blocks 127A-N. In step 301, a query having a selection condition on the first attribute may be received (e.g., by the data classifier application 108). The first attribute may, for example, be a multi-value attribute and the selection condition may comprise a selection on the first and/or second value of the multi-attribute value. For example, the query may select users having mobile phones in Europe with Operator O2 (first value=country, second value=operator). In another example, the query may select users having mobile phones with Operator O2 only.

Upon receiving the query, the data classifier application 108 may in step 303 read the multidimensional data structure for selecting data elements that satisfy the query. For example, the data classifier application 108 may select data elements having a pair of values ("EU-city", "O2"), where EU-city is a name of a European city.

In step 305, the received query may be executed on the portion of data blocks that correspond to the selected data elements. In this way, only the portion of the data blocks is scanned (e.g., from disk).

Figure 4:
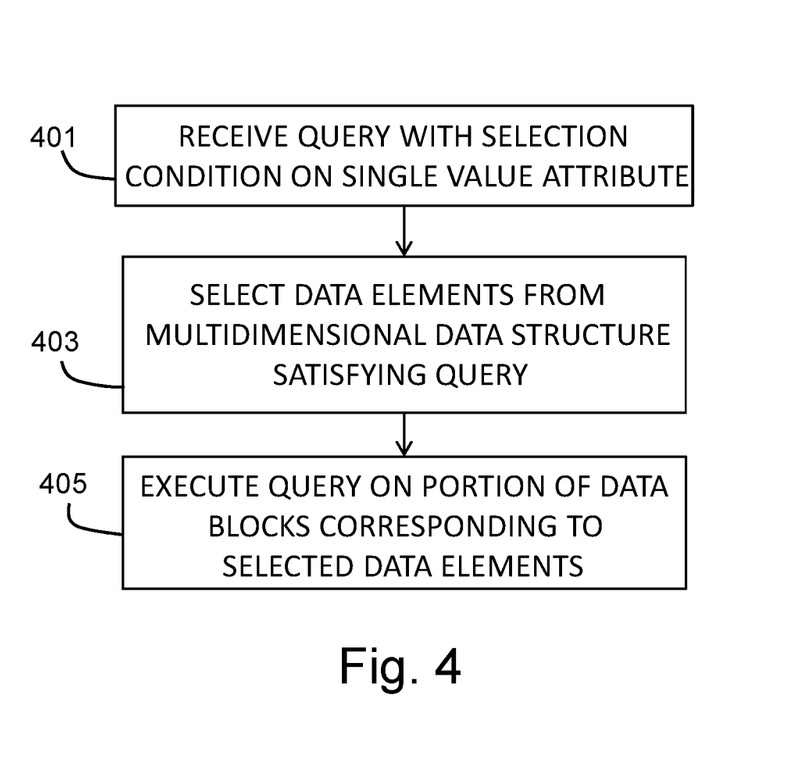
FIG. 4 is a flowchart of another example method for processing data blocks.

FIG. 4 is a flowchart of a method for processing data blocks 127A-N. In step 401, a query having a selection condition on the first attribute may be received (e.g., by the data classifier application 108). The first attribute may, for example, be a single value attribute (e.g., age of users). For example, the query may select users having age between 30 and 50 years. In this case, a query area may be defined by the lower left corner (30, 30) and the upper right corner (50, 70).

Upon receiving the query, the data classifier application 108 may in step 403 read the multidimensional data structure for selecting data elements that satisfy the query. For example, the data classifier application 108 may select data elements having two values, the minimum and the maximum age values that fall partially or completely within the range [30, 50]. For example, a data element of the data elements having two values 40 and 60 years may be selected, since the interval [40, 50] overlaps with interval [30, 50].

In step 405, the received query may be executed on the portion of data blocks that correspond to the selected data elements. In this way only the portion of the data blocks is scanned (e.g., from disk).

Figure 5:
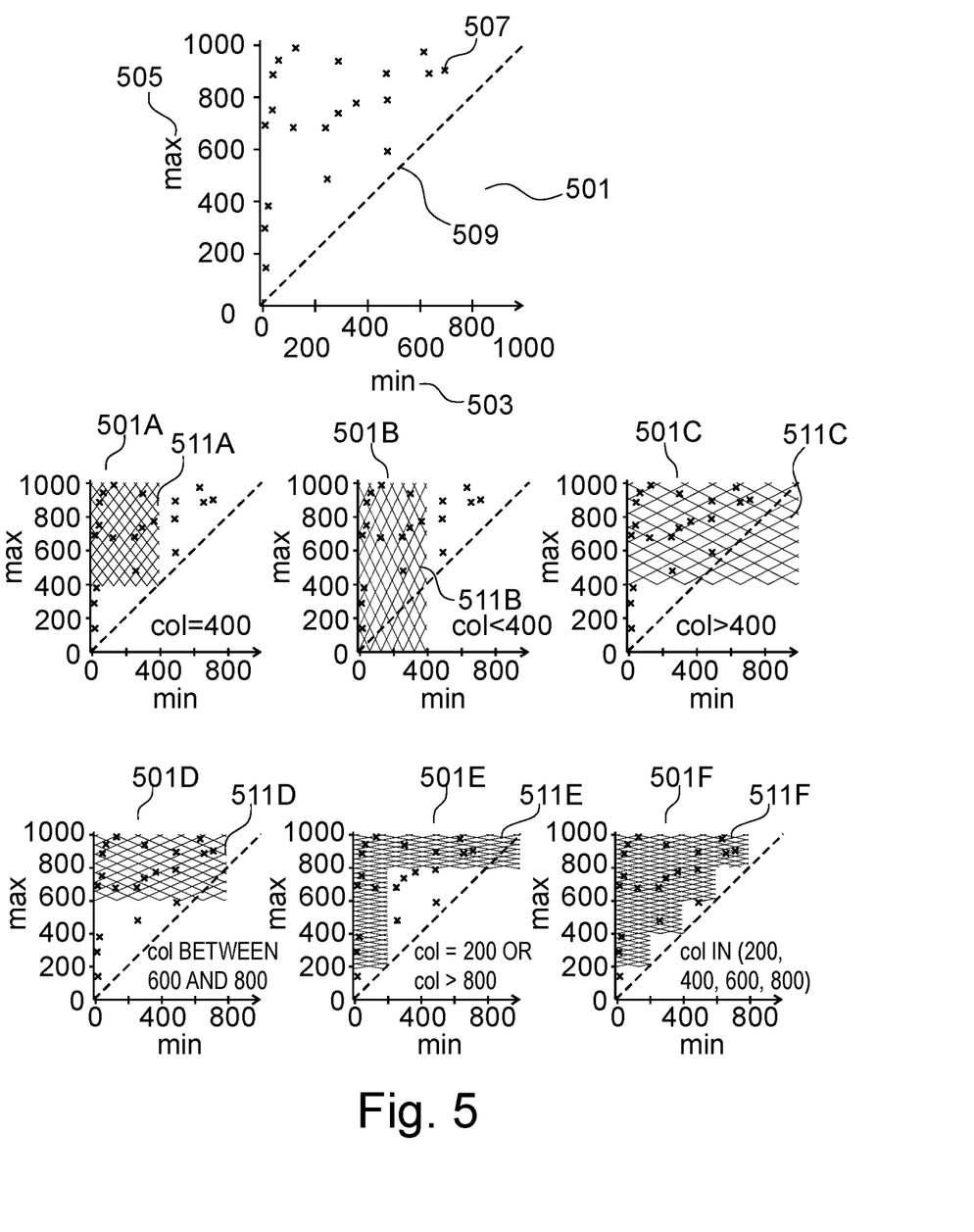
FIG. 5 illustrates a simplified example for processing a data table.

FIG. 5 illustrates a simplified example for processing a data table (e.g., data table 127) in accordance with an embodiment of the present invention. In FIG. 5, a multidimensional data structure (e.g., multidimensional data structure 135) (or the content of the multidimensional data structure) is illustrated by a two dimensional graph or space 501. The minimum and maximum values of a given attribute (referred to as "col") of each data block of 20 data blocks are represented as a point 507 in the two-dimensional space. These points 507 correspond to the data elements of the multidimensional data structure 135 that represent the 20 data blocks. The 20 data blocks may be blocks of a data table, such as data table 127. Moreover, the two-dimensional points 507 do not occur below the diagonal line 509 as max values is greater than min values.

Given the two-dimensional point representation, query predicates on data blocks can be transformed into predicates on the data elements 507 such that the predicates become one or more rectangles that partly cover the two-dimensional space 501. Graphs 501A-F illustrate the two-dimensional areas corresponding to query predicates. For example, graph 501A shows a rectangle 511A that encompasses the data elements 507 that satisfy equality predicate "col=400". Graph 501B shows a rectangle 511B that encompasses the data elements 507 that satisfy a range predicate "col<400". Graph 501C shows a rectangle 511C that encompasses the data elements 507 that satisfy a range predicate or "col>400". Graph 501D shows a rectangle 511D that encompasses the data elements 507 that satisfy predicates combined with Boolean AND (e.g., "col BETWEEN 600 AND 800"). Graph 501E shows a rectangle 511E that encompasses the data elements 507 that satisfy predicates combined with Boolean OR (e.g., "col=200 OR col >800"). Graph 501F shows a rectangle 511F that encompasses the data elements 507 that satisfy the following selection condition on col (e.g., "col IN (200, 400, 600, 800)").

As can be seen in Graphs 501D and 501E, Boolean AND and OR predicates intersect or combine, respectively, producing the (search) areas that correspond to their operands.

The data blocks that the computer system may read or access in order to satisfy a query may be efficiently determined using the multidimensional data structure 135 as a spatial index structure. The spatial index may, for example, contain the min/max values of the attribute of the data blocks as two-dimensional points. Query predicates are converted to their corresponding two-dimensional areas and the spatial index is queried with these areas. This allows evaluation of query predicates from a single index structure in a very efficient manner. This is faster than iterating linearly over the entire data blocks on disk or reading multiple entries with information about the attribute col.

By using the spatial index, a search involving the entire two-dimensional space for covered points may be avoided. Examples of approaches to spatial (or generally multidimensional) indexing may comprise grid-file, R-tree, R*-tree, KD-tree, and space-filling curves. The spatial index may be used to divide the indexed space into axis-parallel index rectangles and only search spatial objects (i.e., points 507) in those index rectangles that are covered by the query area. An index rectangle is either completely contained in, partially overlapping with, or disjoint with the query area. If an index rectangle is contained in the query area, then all its contained points 507 are part of the query result. No individual evaluation is required, so a big improvement over the conventional evaluation methods. Points in index rectangles that the query area partly covers may be evaluated individually (if the index is a tree, the index rectangle may be a leaf node). Index rectangles that are disjoint with the query area may be ignored (not used).

Figure 6:
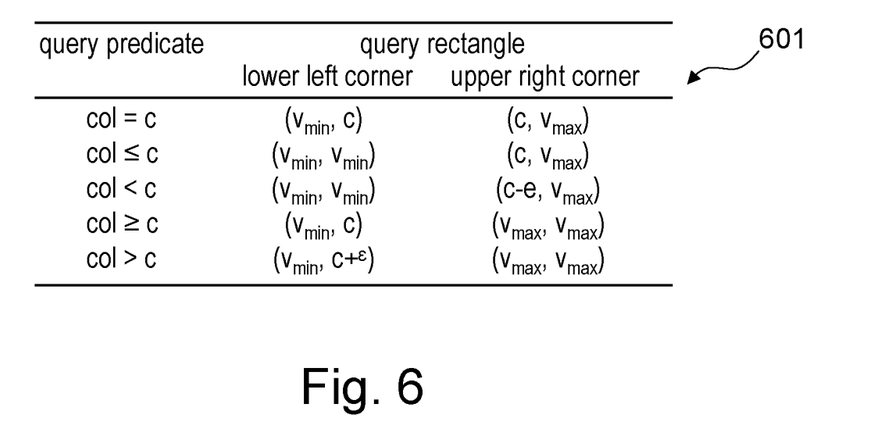
FIG. 6 is a table disclosing different query rectangles for respective query predicates.

The above described method may enable a mapping of the problem "determine from their minimum and maximal value which data blocks a query must read" to the problem "determine which points in a two-dimensional space are covered by one or more given axis-parallel rectangles". As shown in graphs 501A-C, the query rectangles for equality and range predicates are described in table 601 of FIG. 6, where vmin and vmax denote the smallest and largest value of the attribute col, respectively. Alternatively, if this is more practical given the data type of the attribute and the implementation of the spatial index, the values for vmin and vmax can be −∞ and +∞.

To avoid differing between inclusive and exclusive bounds, a modification of the operand of a "<" and ">" predicate may be performed by adding or subtracting the smallest possible increment ε, if the data type of the column allows this to be performed. This results in a query area with inclusive bounds.

As shown in graphs 501D-F, the query area of boolean AND and OR predicates is derived by intersecting or combining the query rectangles of their operands. Note that this may result in a query area that is no longer a single rectangle. However, the query area may be a single polygon that includes the upper left corner (vmin; vmax) and that can be decomposed into adjacent axis parallel rectangles. Thus, there are no gaps, holes, diagonal edges, or disconnected areas. This makes it particularly easy to utilize a spatial index.

For example, disjunctions on query predicates may result in query areas that are not a single rectangle, but a polygon. As stated, the query areas that are generated by the present method may be decomposed into one or more axis-parallel rectangles. Consequently, it is favorable to query the index with such a set of rectangles.

It is quite probable that several query rectangles overlap the same index rectangle. In this case, it should be ensured that the index rectangle is only processed once. It is thus unfavorable to query the index multiple times, once for each query rectangle. First of all, this requires an evaluation of the multiple overlapped index rectangles several times, which means multiply evaluating every contained point, as such index rectangles are always partially covered. Second, if the query rectangles overlap each other, it may also be necessary to eliminate duplicates from the index result. Consequently, the spatial index should support being queried with a set of rectangles and handling multiple overlapped index rectangles internally.

Figure 7:
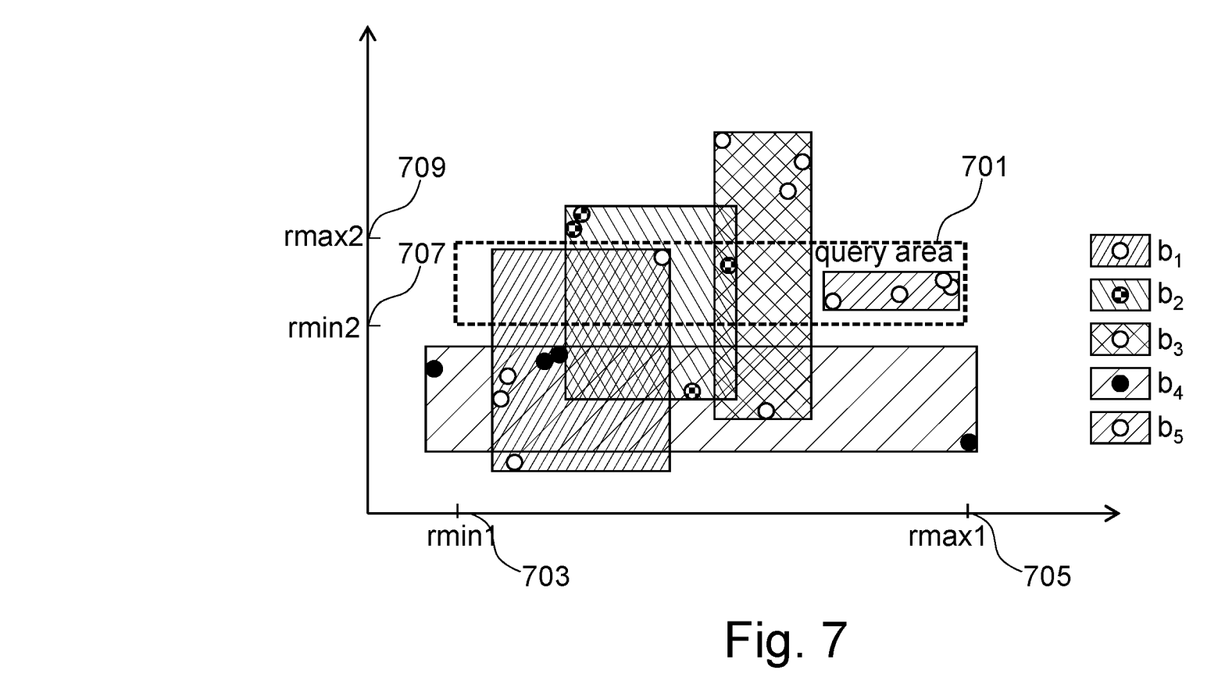
FIG. 7 illustrates a further example method for querying spatial data.

FIG. 7 illustrates a further example method for querying spatial data in accordance with the present disclosure. The term dimension as used in this example of FIG. 7 refers to a spatial dimension of spatial data.

Instead of having a single pair of [min/max] values per data block that describe an attribute of the data block, multiple pairs [min1/max1,min2/max2, . . . , minn/maxn] may be used so as to describe values of a given attribute of a data table 127. The single pair [min, max] may be used to describe one-dimensional spatial data, while the multiple pairs [min1/max1,min2/max2, . . . , minn/maxn] may be used to describe n-dimensional spatial data. The n pairs may define an n-dimensional minimum bounding rectangle (MBR) in the form of [min1/max1,min2/max2, . . . , minn/maxn] per data block. For example, the given attribute may comprise n sub-attributes with each sub-attribute having a respective value. The respective value may have a min/max pair that defines the minimum and maximum values of the sub-attribute. The n pairs may be the values of a data element of a 2n dimensional data structure.

The minimum bounding rectangle of a data block b on a spatial table column c (i.e., the given attribute) may be defined as the smallest axis-parallel n-dimensional rectangle that contains all attribute values of the given attribute that are stored in b. In the interest of a simpler presentation, assume n=2 in this example, without loss of generality. n=2 is typical for actual spatial data management, however, the present method may equally be applicable for higher numbers of dimensions.

FIG. 7 illustrates the minimal bounding rectangles of five data blocks b1-b5 containing four spatial objects each in two-dimensional space. FIG. 7 further illustrates a query area 701. For example, the query area 701 may be defined by two selections on each dimension of the two dimensional spatial data. For example, rmin1 703 and rmax1 705 defines the range cut on the values of the first dimension of the two-dimensional data, while rmin2 707 and rmax2 709 may define a second range cut on the second dimension of the two-dimensional data. For example, the given attribute may comprise a first sub-attribute indicating the longitude and a second sub-attribute indicating the latitude. The two sub-attributes may refer to the two-dimensions.

As the MBR may include all dimensions that spatial query predicates refer to, better data block filtering may be possible as compared to the state-of-the-art. In the shown example, the approach to use the MBR of each data block is capable of skipping block b4. By contrast, the approach shown with reference to FIG. 5 (e.g., where the cutting is performed on a single dimension only) may be incapable of determining that not a single spatial object from b4 lies within the query area that cuts on two dimensions. In addition to that, using the MBR data, blocks can be identified that are entirely contained within the query area, so that a row-by-row evaluation of each contained spatial object is not required. Block b5 illustrates this.

The example shown with reference to FIG. 7 may enable efficient spatial queries in analytical database systems.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments of the invention may be described by the following feature combinations.

1. A computer implemented method for processing a data table, comprising:
dividing the data table into a plurality of data blocks;
generating a multidimensional data structure for representing the plurality of the data blocks;
for each data block of at least part of the plurality of data blocks adding a respective data element into the multidimensional data structure, the data element has multiple values indicative of a first attribute of the data block;
storing the multidimensional data structure for selectively processing a portion of the data blocks using the multidimensional data structure.

2. The method of feature combination 1, the selective processing comprising:
receiving a query having a selection condition on the first attribute;
selecting data elements of the multidimensional data structure whose multiple values satisfy the received query;
executing the received query on the data blocks that correspond to the selected data elements.

3. The method of feature combination 1 or 2, the first attribute being a single value attribute, the multiple values comprising the maximum and the minimum values of the first attribute in the respective data block, the multidimensional data structure comprising a spatial index.

4. The method of feature combination 3, wherein the maximum and the minimum values define a first range of values of the first attribute in a respective data block, the method further comprising:
receiving a query requiring a second range of values of the first attribute;
selecting data elements of the spatial index whose first ranges overlap with the second range;
executing the received query on the data blocks that correspond to the selected data elements.

5. The method of feature combination 1 or 2, the first attribute being a multi-value attribute comprising a first and a second value, wherein the first and second values are treated as a two-dimensional point in the multidimensional data structure.

6. The method of feature combination 5, further comprising:
receiving a query having a selection condition on the first value and/or second value,
selecting data elements of the multidimensional data structure whose first and/or second value satisfies the selection condition on the first and/or second value respectively;
executing the received query on the data blocks that correspond to the selected data elements.

7. The method of any of the previous feature combinations 1-6, the dividing of the data table being randomly performed or through a preselection criterion using values of the first attribute.

8. The method of feature combination 7, the preselection criterion comprises one of:
each data block of the plurality of data blocks having a predefined range of values of the first attribute;
a predefined selection on a single value of the multiple values of the first attribute, wherein the first attribute is a multi-value attribute.

9. The method of any of the previous feature combinations 1-8, the first attribute being a spatial and/or temporal coordinate.

10. The method of feature combination 9, the multiple values specifying the spatial coordinate, wherein the multiple values are treated as a two, three or four dimensional point in the multidimensional data structure.

11. The method of feature combination 10, the multiple values comprising one of:
north, east, south, west directions;
latitude, longitude and elevation.

12 The method of any of the previous feature combinations 9-11, further comprising:
receiving a spatial query that specifies a query window defined by selection on two or more values of the first attribute;
selecting data elements of the multidimensional data structure whose multiple values intersect the query window;
executing the received query on the data blocks that correspond to the selected data elements.

13. The method of any of the previous feature combinations 1-12, further comprising providing processing resources for processing a predefined maximum size of data, the data table having a size higher than the maximum size and each data block of the plurality of data blocks having a size smaller than the maximum size.

14. The method of any of the previous feature combinations 1-13, each data block of the plurality of data blocks containing an equal or unequal number of rows of the data table.

15. The method of any of the previous feature combinations 1-14, wherein the plurality of data blocks have no common rows of the data table.

What is claimed is:

1. A computer implemented method for processing a data table comprising:
   dividing the data table into a plurality of data blocks, wherein the dividing of the data table is performed randomly;
   generating a multidimensional data structure for representing the plurality of data blocks, wherein the multidimensional data structure comprises a spatial index;
   for each data block of at least part of the plurality of data blocks, adding a respective data element into the multidimensional data structure, the data element having multiple values indicative of a first attribute of the data block, wherein the first attribute includes a single value attribute, wherein the multiple values comprise an indication of maximum and minimum values of the first attribute in the respective data block, and wherein each pair of maximum and minimum values is represented as a two-dimensional point in the spatial index; and
   storing the multidimensional data structure for selectively processing a portion of the data blocks using the multidimensional data structure, wherein identifying the portion of the data blocks that is selectively processed comprises converting a query predicate into a two-dimensional area, and identifying data blocks whose two-dimensional point of the minimum and maximum values in the spatial index is encompassed by the two-dimensional area.

2. The method of claim 1, wherein the selectively processing comprises:
   receiving a query having a selection condition on the first attribute;
   selecting data elements of the multidimensional data structure whose multiple values satisfy the received query; and
   executing the received query on the data blocks that correspond to the selected data elements.

3. The method of claim 1, wherein the maximum and the minimum values define a first range of values of the first attribute in a respective data block, and the method further comprises:
   receiving a query requiring a second range of values of the first attribute;
   selecting data elements of the spatial index whose first range overlaps with the second range; and
   executing the received query on the data blocks that correspond to the selected data elements.

4. The method of claim 1, wherein the first attribute further includes a multi-value attribute comprising a first and a second value, and wherein the first and second values are treated as a two-dimensional point in the multidimensional data structure.

5. The method of claim 4, further comprising:
   receiving a query having a selection condition on one or more selected from a group of the first value and the second value,
   selecting data elements of the multidimensional data structure with one or more values satisfying the selection condition; and
   executing the received query on the data blocks that correspond to the selected data elements.

6. The method of claim 1, wherein the first attribute is one or more selected from a group of a spatial coordinate and a temporal coordinate.

7. The method of claim 6, wherein the multiple values specify the spatial coordinate, and wherein the multiple values are treated as a two, three, or four dimensional point in the multidimensional data structure.

8. The method of claim 7, wherein the multiple values comprise one of:
   north, east, south, and west directions; and
   latitude, longitude, and elevation.

9. The method of claim 6, further comprising:
   receiving a spatial query that specifies a query window defined by selection on two or more values of the first attribute;
   selecting data elements of the multidimensional data structure whose multiple values intersect the query window; and
   executing the received query on the data blocks that correspond to the selected data elements.

10. The method of claim 1, further comprising:
    providing processing resources for processing a predefined maximum size of data, wherein the data table has a size higher than the maximum size and each data block of the plurality of data blocks has a size smaller than the maximum size.

11. The method of claim 1, wherein each data block of the plurality of data blocks contains one of an equal number of rows of the data table or an unequal number of rows of the data table.

12. The method of claim 1, wherein the plurality of data blocks have no common rows of the data table.

13. A computer program product comprising a computer readable storage medium having program instructions embodied therewith, the program instructions executable by a processor to:
    divide the data table into a plurality of data blocks, wherein the dividing of the data table is performed randomly;
    generate a multidimensional data structure for representing the plurality of data blocks, wherein the multidimensional data structure comprises a spatial index;
    for each data block of at least part of the plurality of data blocks, add a respective data element into the multidimensional data structure, the data element having multiple values indicative of a first attribute of the data block, wherein the first attribute is a single value attribute, wherein the multiple values comprise an indication of maximum and minimum values of the first attribute in the respective data block, and wherein each pair of maximum and minimum values is represented as a two-dimensional point in the spatial index; and
    store the multidimensional data structure for selectively processing a portion of the data blocks using the multidimensional data structure, wherein identifying the portion of the data blocks that is selectively processed comprises converting a query predicate into a two-dimensional area, and identifying data blocks whose two-dimensional point of the minimum and maximum values in the spatial index is encompassed by the two-dimensional area.

14. A computer system for processing a data table, the computer system including a processor configured to:
    divide the data table into a plurality of data blocks, wherein the dividing of the data table is performed randomly;
    generate a multidimensional data structure for representing the plurality of data blocks, wherein the multidimensional data structure comprises a spatial index;

for each data block of at least part of the plurality of data blocks, add a respective data element into the multidimensional data structure, the data element having multiple values indicative of a first attribute of the data block, wherein the first attribute is a single value attribute, wherein the multiple values comprise an indication of maximum and minimum values of the first attribute in the respective data block, and wherein each pair of maximum and minimum values is represented as a two-dimensional point in the spatial index; and store the multidimensional data structure for selectively processing a portion of the data blocks using the multidimensional data structure, wherein identifying the portion of the data blocks that is selectively processed comprises converting a query predicate into a two-dimensional area, and identifying data blocks whose two-dimensional point of the minimum and maximum values in the spatial index is encompassed by the two-dimensional area.

15. A computer implemented method for processing attribute value information on data blocks of a data table comprising:

providing attribute value information for at least a first attribute contained in data blocks of the data table, wherein the attribute value information includes a minimum attribute value of a data block and a maximum attribute value of a data block, and wherein the data blocks are produced by randomly dividing the data table;

creating a spatial index on the attribute value information of the first attribute, wherein the minimum attribute values and the maximum attribute values for the data blocks are treated as two-dimensional points; and storing the spatial index for selectively processing a portion of the data blocks using the spatial index, wherein identifying the portion of the data blocks that is selectively processed comprises converting a query predicate into a two-dimensional area, and identifying data blocks whose two-dimensional point of the minimum and maximum values in the spatial index is encompassed by the two-dimensional area.

* * * * *